United States Patent

Trautman

[15] 3,693,920
[45] Sept. 26, 1972

[54] RETRACTABLE CARGO SECURING DEVICE

[72] Inventor: Robert D. Trautman, Seattle, Wash.

[73] Assignee: The Boeing Company, Seattle, Wash.

[22] Filed: Dec. 9, 1970

[21] Appl. No.: 96,393

[52] U.S. Cl..........248/119 R, 248/361 R, 105/366 C, 105/369 A
[51] Int. Cl...........................B65d 45/00, B61d 45/00
[58] Field of Search..248/361 R, 119 R, 284; 312/24

[56] References Cited

UNITED STATES PATENTS

| | | |
|---|---|---|
| 3,377,040 | 4/1968 | Hansen..................248/361 X |
| 2,161,323 | 6/1939 | Stephenson.............248/284 X |
| 2,822,229 | 2/1958 | Carlson...................248/284 X |
| 3,306,234 | 2/1967 | Hansen ..............248/361 R X |
| 3,282,550 | 11/1966 | Warren.....................248/361 |

*Primary Examiner*—Chancellor E. Harris
*Attorney*—Glenn Orlob, Kenneth W. Thomas and Nicolaas De Vogel

[57] ABSTRACT

A cargo securing device which can be positioned in a retracted position flush with an associated floor level and then raised to a cargo securing position. The device carries a cargo engaging lug member pivotally connected to two linking members which are swing mounted to the cargo securing device base frame.

5 Claims, 10 Drawing Figures

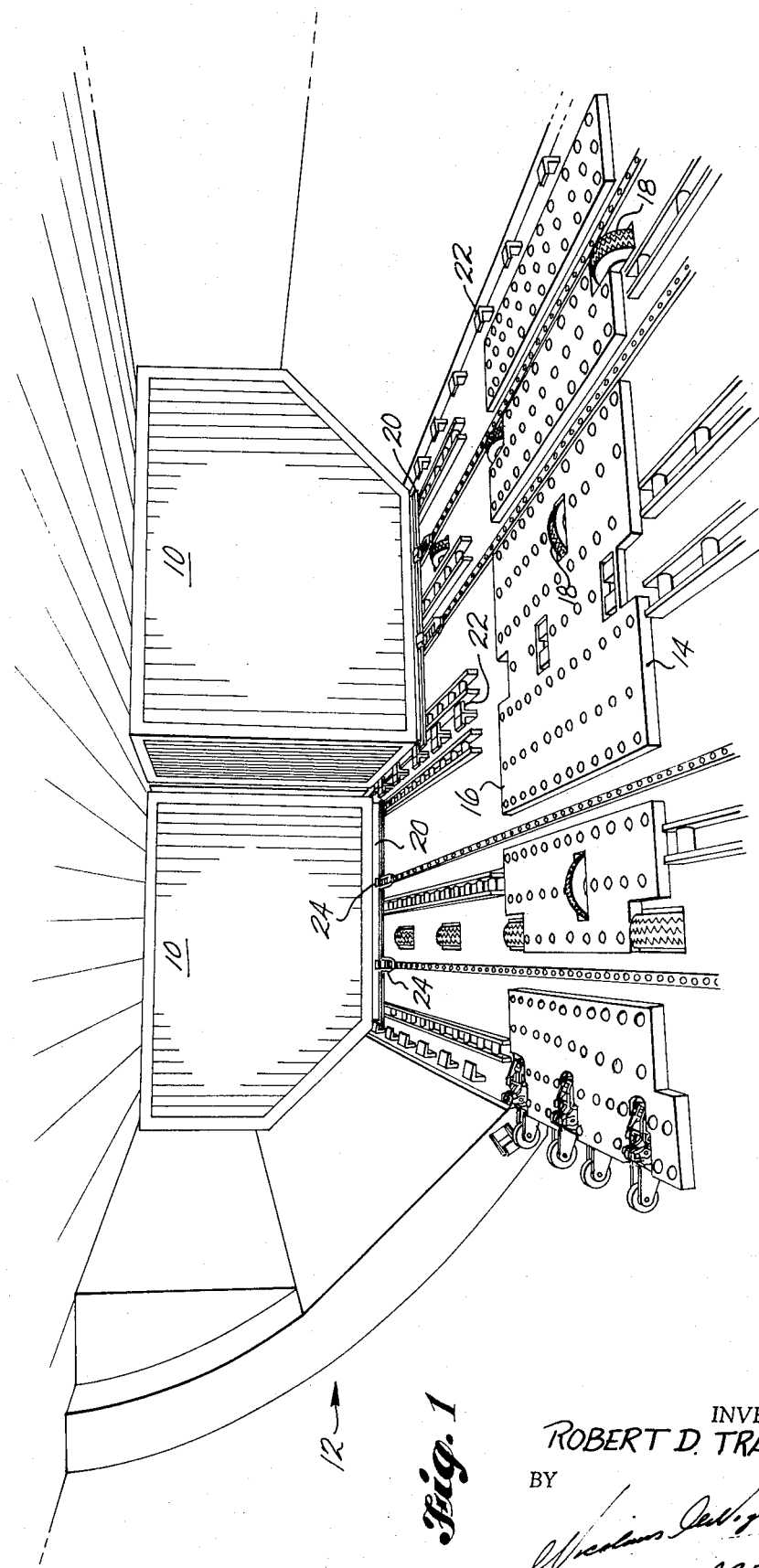

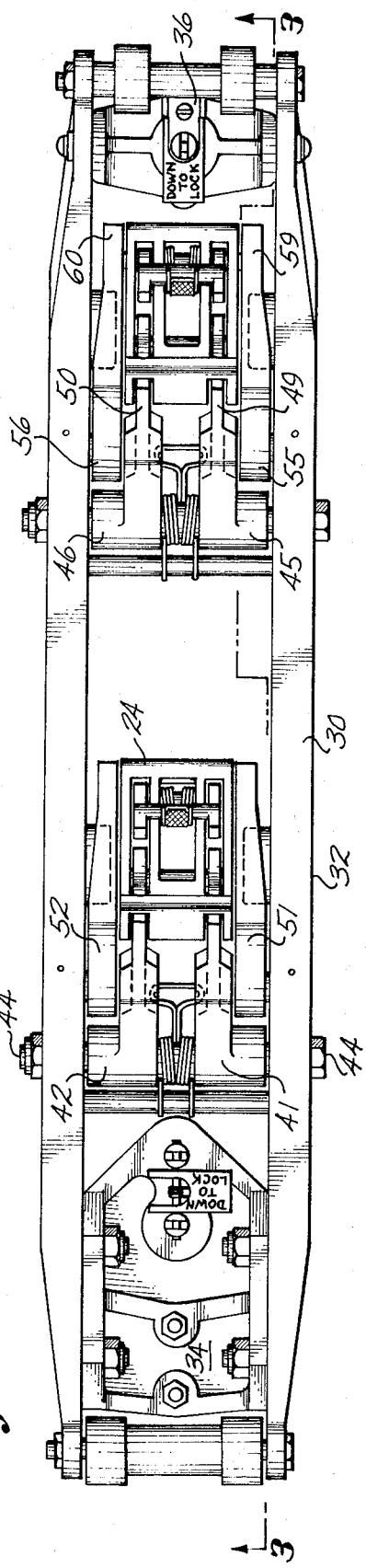
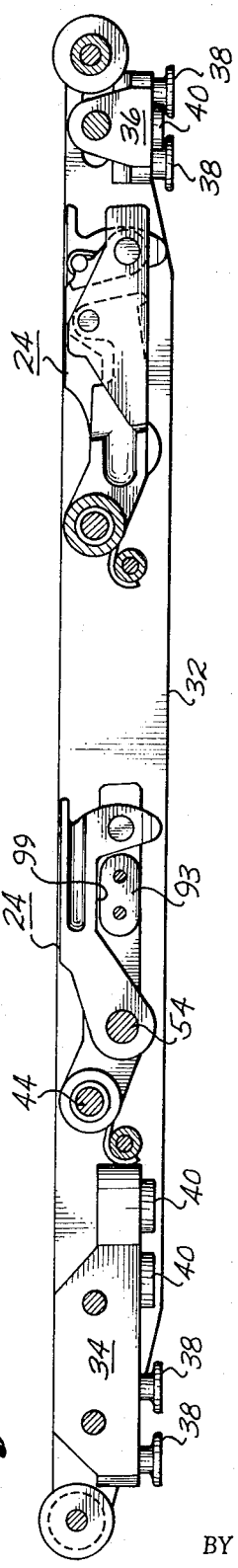

INVENTOR.
ROBERT D. TRAUTMAN
BY
AGENT

PATENTED SEP 26 1972

INVENTOR.
ROBERT D. TRAUTMAN
BY
AGENT

RETRACTABLE CARGO SECURING DEVICE

BACKGROUND OF THE INVENTION

1. Field of the Invention

This invention relates to cargo handling apparatus and more particularly to a retractable cargo locking device for holding cargo pallets in secure position. The present invention was conceived to improve cargo handling apparatus in aircraft but obviously is usable in all types of commercial vehicles or cargo storing locations.

2. Description of the Prior Art

The present invention is an improvement over recently issued U.S. Pat Nos. 3,306,234 and 3,377,040 by Richard J. Hansen et al. The improvement resides in an absolute locking means which is employed when the device is actuated into the cargo engaging position and in a different and less space consuming folding-up mechanism when the device is in its retracted position.

SUMMARY OF THE INVENTION

The preferred embodiment of the present invention comprises a base frame member adapted to be selectively mounted at various floor locations to a floor member or seat track of an aircraft.

Mounted to this frame is a cargo securing assembly which comprises a first and a second linkage member, each provided with a root end and swing end. The linkage members are individually pivotally mounted to the base frame member and extend parallel and coincidental to the frame member in the retracted position and perpendicular to the frame member in the cargo engaging position.

The swing ends of the first and second linkage members are pivotally secured to their related location on a cargo engaging lug, which in the retracted position lies together with the first and second linkage member coinciding with the base frame and disposes parallel in spaced relationship with the base frame in the cargo engaging position.

A locking member is pivotally mounted on the cargo lug and has a spring which is biased to lock the locking member with a cam provided on the first linkage swing ends during the cargo engaging position. The locking member is firmly hooked by the cam by two forces, the first caused by the locking member spring biasing the locking member against the cam in complementing relationship and the second force caused by a spring means mounted at the root end of the first linkage pivot-to-frame connection, which spring exerts a biasing force onto the first linkage against the locking member and towards the retracted position.

Disengagement of the locked cargo engaging position to the folded-up or retracted position of the cargo securing assembly can only be accomplished by manually pivoting the locking member-to-cam complementing engagement away from one another or in the direction opposite to the biased force of the locking member spring, which in turn collapses the assembly. This collapsing or folding of the assembly moves the first linkage, the second linkage, the locking member and the cargo lug in the retracted position within the base member aided by the assisting force of the first linkage spring means.

Thus, it is an object of the present invention to provide an improved retractable cargo securing device of the type described above, which has especially desirable characteristics for use in an aircraft, and particularly in an aircraft which serves both cargo and passenger carrying functions.

Furthermore, it is an object to provide such a cargo securing device which is reliable, sufficiently strong, relatively simple, compact, easy to operate and maintain, and has a relatively small thickness (i.e., height dimension) and length.

It is a further particular object to provide such a device which in its cargo engaging position can reach over a cargo pallet an adequate distance to properly grip the cargo pallet, and yet in its retracted position has a relatively small height dimension, and its upper surface flush with the floor.

These and other objects and features of the invention will be more readily understood and appreciated from the following detailed description of the preferred embodiment thereof selected for purposes of illustration and shown in the accompanying drawings.

IN THE DRAWINGS

FIG. 1 is a perspective view of a cargo area in a 747 airplane;

FIG. 2 is a plan view of an actual floor mounting device carrying two cargo securing devices in retracted or folded position;

FIG. 3 is a sectional view taken along line 3—3 of FIG. 2;

Figure 10:
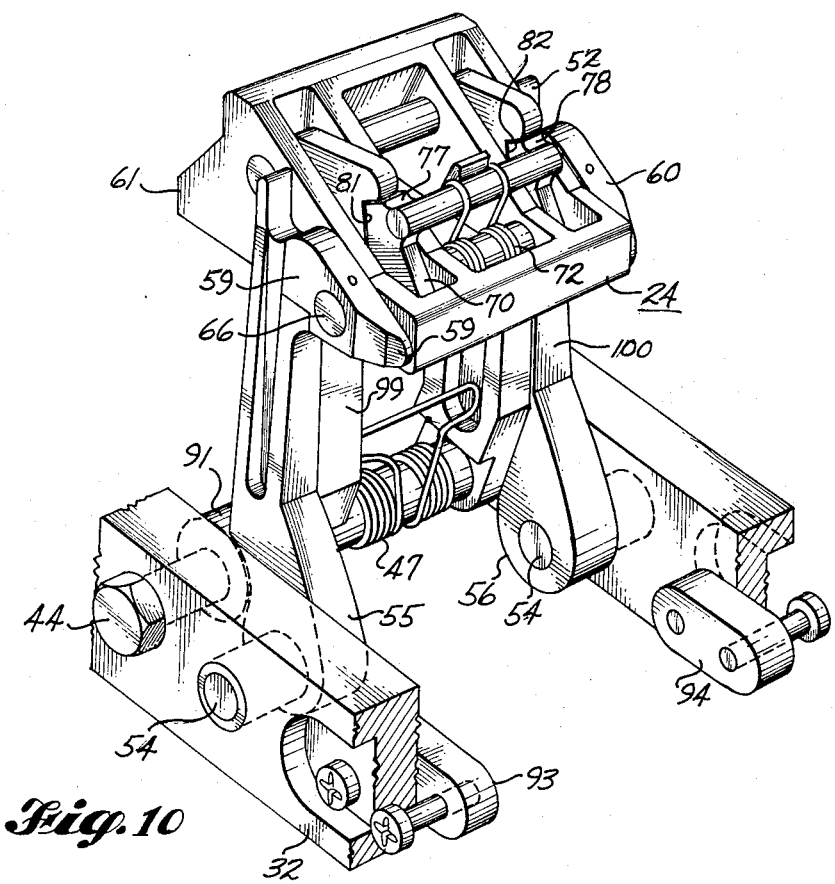
Figure 9:
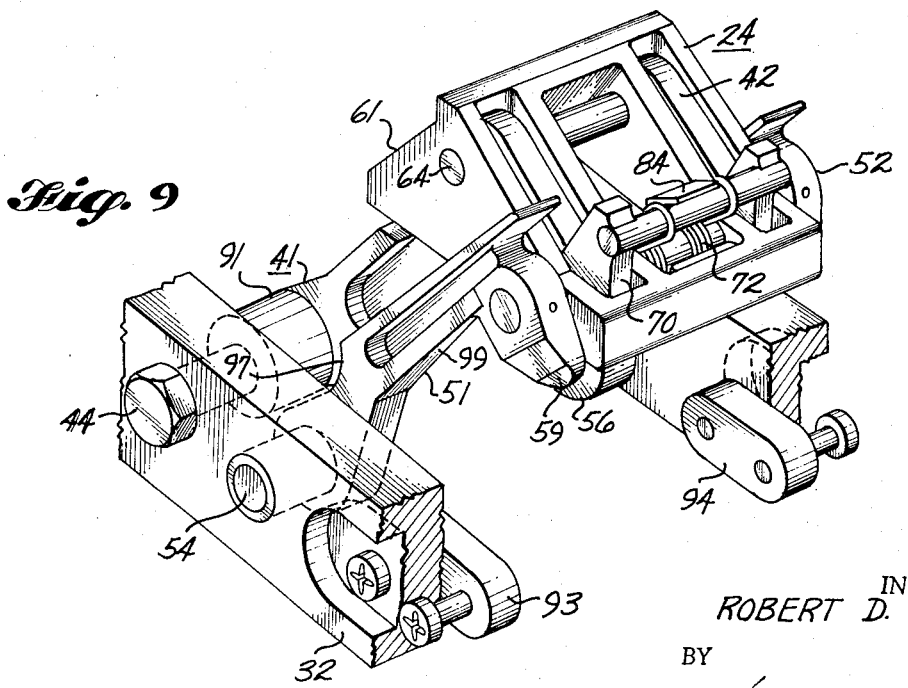

the retracted 8 is a schematic side view of the cargo securing assembly in three moving steps superimposed on one another and showing theretracted position, the intermediate position and the raised or cargo engagement position;

FIG. 9 is a perspective view of the cargo securing assembly in the intermediate or half-way raised position;

FIG. 10 is a perspective view of the cargo securing assembly in the cargo engagement or upright locked position.

DESCRIPTION OF THE INVENTION

The present invention was specifically designed for aircraft use as part of a system called a "quick-change" system by which an airplane can very quickly be converted from a passenger-carrying aircraft to a cargo-carrying aircraft.

The floor mounting devices are therefore provided with means to match the seat track openings, which means can lock on to the seat track firmly and in a matter of seconds at any desired location on the seat track.

As shown in FIG. 1, the cargo area is provided with various systems for loading and unloading cargo pallets or containers in an efficient and speedy manner. For example, a cargo container 10 enters through the doorway 12 and moves onto a platform 14 provided with a plurality of casters 16 and powered drive wheels 18. As soon as the container 10 is correctly positioned on the platform 14, the container 10 is moved in a direction normal from entering and then placed in its final stowage location. It should be noted that the cargo containers 10 are provided with an edge 20 surrounding the container bottom.

In order that the container 10 is properly aligned and kept in place, a plurality of hooks or cargo retraints 22 are employed which are located in spaced relationship from one another in longitudinal directions. Thus, the container 10 is prevented from moving in a transverse direction by the hooks 22 extending about the edge 20. However, the hooks 22 are not tightening the containers 10 in a secured, unmovable stowage condition and therefore a plurality of cargo securing devices 24 are installed on the seat tracks 26 at required locations within a matter of seconds, as shown in FIG. 1.

Those retractable cargo securing devices 24 are generally mounted in pairs on a floor mounting means 30 so that each device 24 holds one cargo container 10 rather than one device 24 securing two containers 10 at each side. Also, a floor mounting device 30 carrying two cargo securing devices 24, as shown in FIGS. 1 – 5, provides for more space between containers 10 for fire protection, heating and ventilation purposes.

The securing device 24 comprises a base frame 32 made up of a right and left section. The forward and rear ends of the frame 32 are provided with adjustable seat track floor mounting mechanisms 34 and 36 respectively. The operation of these mechanisms, using tow members 38 and movable plugs 40, are well known in the prior art and explanation thereof is deemed unnecessary and regarded as being clearly disclosed in FIGS. 5 and 6.

The securing device 24 in its retracted position is shown in the plan view 2, 3 and the perspective illustration 7. A pair of first linkages 41 and 42 are pivotally mounted at an axle 44 transversely positioned between the frame 32 left and right side. The root portions 45 and 46 of the first linkages 41 and 42 are adapted to pivot about axle 44. A spring means 47 is mounted on the axle 44 and attaches against the members 41 and 42, thereby pushing the same in the retracted position. Each first linkage member 41 and 42 has a swing end 49 and 50, respectively.

A pair of second linkage members 51 and 52 are pivotally mounted about an axle 54 which is located tranversely between the frame 32 left and right side and parallel to axle 44. (Axle 54 comprises two parts, one in the right and one in the left frame 32 side; however, a continuous axle could be used and is just a matter of design. For clarification purposes, axle 54 is herein considered a one-piece axle.) The root end portions 55 and 56 of the second linkages 51 and 52 are adapted to pivot about axle 54.

Each second linkage member 51 and 52 has a swing end 59 and 60, respectively.

Figure 4:
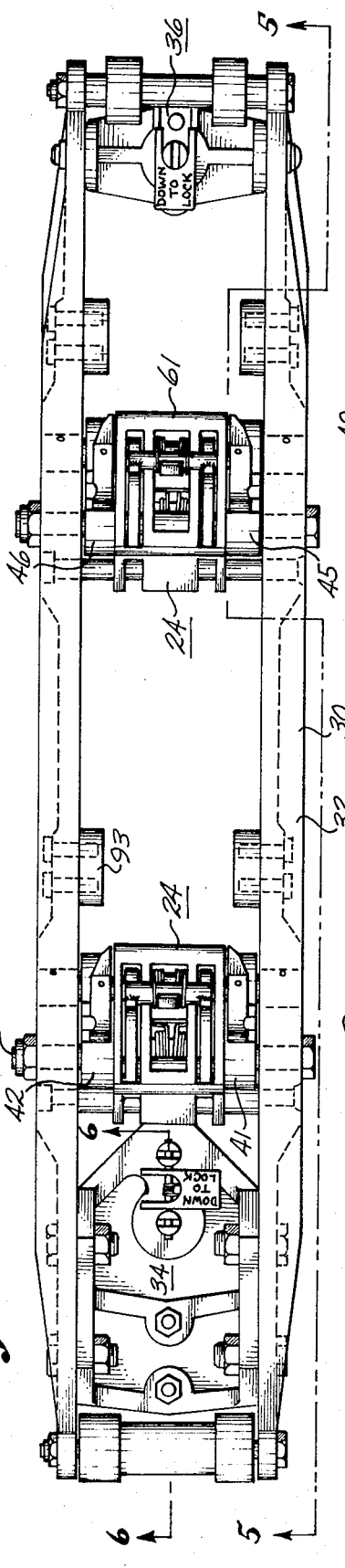
FIG. 4 is a plan view of the device shown in FIG. 2 in a cargo-engaging position.
Figure 5:
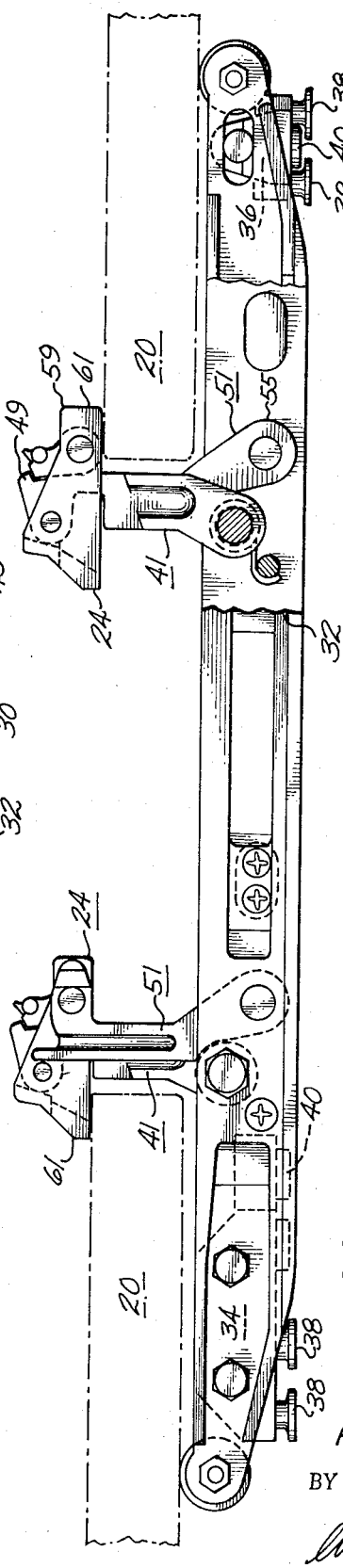
FIG. 5 is a sectional view taken along line 5—5 of FIG. 4.
Figure 6:
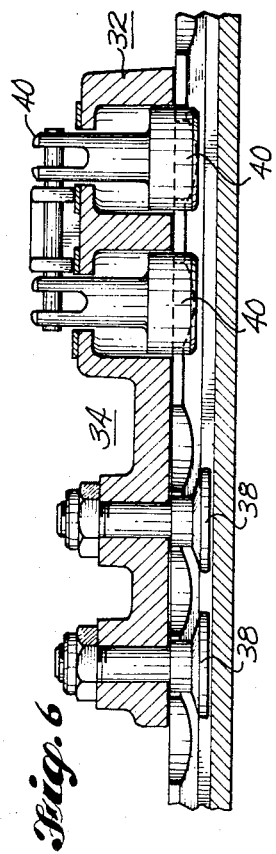
FIG. 6 is a sectional view taken along line 6—6 of FIG. 4.
Figure 8:
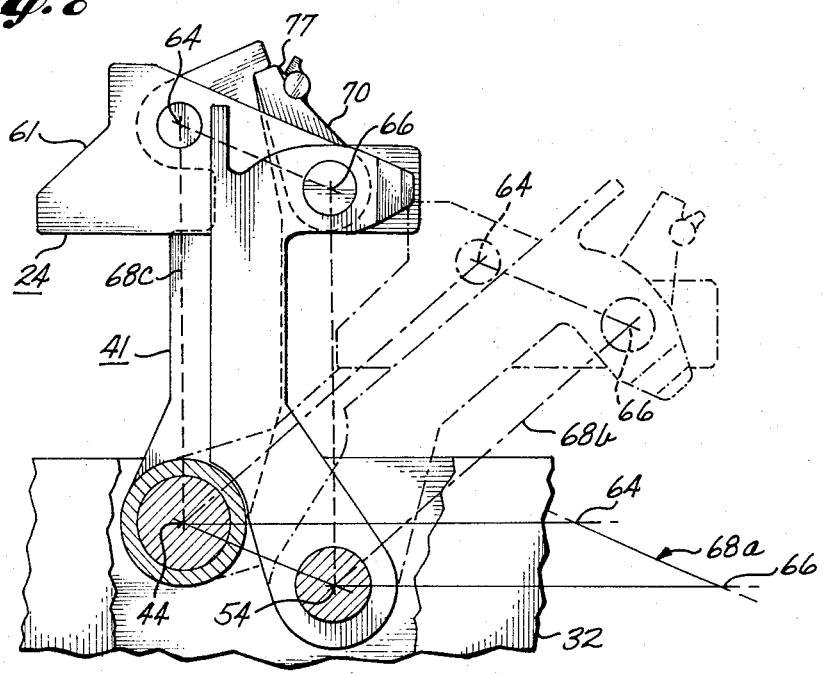

A cargo lug 61 is pivotally carried by the first pair of swing ends 49 and 50 and second pair of swing ends 59 and 60. In its cargo engaging position, the cargo lug 61 extends parallel to the frame 32 as shown in FIGS. 4, 5, 8 and the perspective views 9 and 10. Preferably an axle 64 disposed in lug 61 carries the swing ends 49 and 50, and an axle 66 disposed in lug 61 at a location parallel to the axle 64 carries the swing ends 59 and 60.

When considering the axles 44, 54, 64 and 66 as axes or corner intersections of a parallelogram 68, as schematically illustrated in FIG. 8, the fold-out operation of the device 24, from its retracted 68a via halfway position 68b to its fully erected 68c or cargo engaging position, can be clearly visualized.

In order to lock the device 24, when lifted into the cargo engaging position, a locking member 70 having a spring 72, pivotally mounted about axle 66, is used to prevent return of the linkage members 41 and 42 towards the frame 32. The locking member 70 has protruding integral pawl portions 77 and 78 which are urged by the spring 72 against cam portions 81 and 82 provided in the swing ends 49 and 50. Upon locking of member 70 with the linkage members 41 and 42, the pawl portions 77 and 78 complement into the cam portions 81 and 82, respectively, so that a firm locking arrangement is accomplished which is intensified by the two springs 47 and 72 oppositely biased forces. A lip 84 is provided on the locking member 70 for manually pivoting the locking member 70 about the axle 66, against the spring 72 force, for disconnecting the lug 61 from an associated cargo container 10 edge portion 20. To prevent over rotation of the securing assembly in the cargo engaging as well as in the retracted position, stop portions 91 and 92 and stop blocks 93 and 94 are employed. The stop portions 91 and 92 are located on members 41 and 42, and the portions 97 and 98 on members 51 and 52 are stopped against stop portions 91 and 92 so that over rotation of the assembly is controlled.

Figure 7:
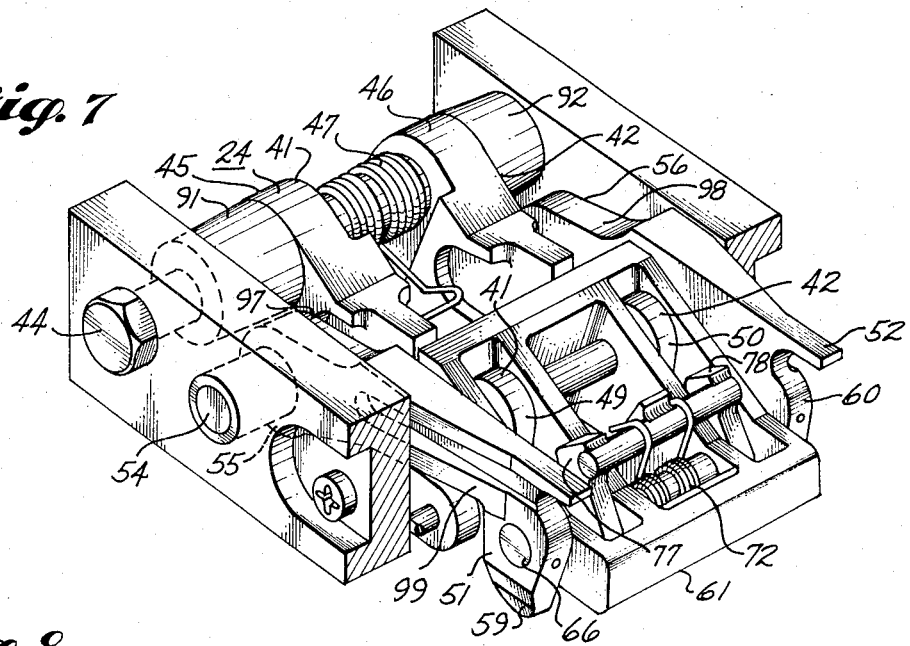
FIG. 7 is a perspective view of the cargo securing assembly of the cargo securing device in the retracted position.

In the retracted position, the stop blocks 93 and 94, mounted inside the frame 32 right and left side, respectively, control the members 51 and 52 folded in location. The stops 93 and 92 engage with the sides 99 and 100 of the members 51 and 52 as indicated in FIGS. 3, 7 and 10.

While there has been shown and described the fundamental and novel features of this invention, it will be understood that various omissions, substitutions and changes in the form and details of the device 24 illustrated may be made by those skilled in the art without departing from the spirit of the invention.

Now, therefore, I claim:

1. A securing device, comprising: a base member adapted to be mounted in a recess in a floor; a first linkage member having a root end by which said first member is pivotally secured to said base member, and having a swing end which can be swung upwardly from a first retracted position to a second upstanding cargo engaging position; a second linkage member having a root end by which said second member is pivotally secured to said base member, and having a swing end which can be swung upwardly from a first retracted position to a second upstanding cargo-engaging position; a cargo securing lug member which is rotationally secured by one end to said swing end of said first member and by its other end to said swing end of said second member, whereby; with said first and second members in their upstanding cargo-engaging position, said lug member extends parallel to and raised above said base member in a cargo-engaging position, and whereby, with said first and second members in their retracted position, said lug member is substantially coincidingly disposed in a retracted position with said base member; a locking member pawl pivotally connected to said lug member; cam means disposed on said first member swing end for complementing engagement with said locking member pawl when said first and second members are in said second upstanding cargo-engaging position for preventing retraction of said securing device; a first spring means mounted between said base member and said first linkage member for applying a force which biases said first linkage member in said retracted position with said base member; a second spring means mounted between said locking member and said cargo securing lug member for applying a force which biases said locking member pawl about its pivoting connection against said second linkage member swing end portion for complementing engagement of said locking member pawl with said cam in said upstanding cargo-engaging position of said first and second linkage members; and said second linkage members being provided with a short extended handle portion and wherein said lockin pawl member is provided with a lip portion for respectively manually lifting said linkage members and lug into said position by said extended handle portion and for unlocking said locking pawl from said cam by manually pressing said lip portion for disengagement of said pawl from said cam for collapsing said locked lug member into said retracted position.

2. A securing device as claimed in claim 1 wherein said first and said second linkage members comprise a pair of first and a pair of second linkage members respectively, each pair of members identically and symmetrically mounted between said base and said cargo-engaging lug so that an evenly distributed holding strength is maintained to said cargo-engaging lug when said lug is in said upstanding engaging position pivotally mounted between said swing ends of said first and said second linkage members while holding an associated cargo container bottom edge.

3. A securing device as claimed in claim 1 wherein said base member has a generally flat configuration and is provided with a toe and plug type mounting arrangement at front and rear end for snap-on mounting to an associated seat track.

4. A securing device as claimed in claim 3 wherein said second linkage members are provided with a short extended handle portion and wherein said locking pawl member is provided with a lip portion for respectively manually lifting said linkage members and lug into said cargo-engaging position by said extended handle portion and for unlocking said locking pawl from said cam by manually pressing said lip portion for disengagement of said pawl from said cam for collapsing said locked lug member into said retracted position.

5. A securing device, comprising: a base member having a generally flat configuration and being provided with a toe and plug type mounting arrangement at front and rear end for snap-on mounting to an associated seat track; a pair of first linkage members having a root end by which said first members are pivotally secured to said base member, and having a swing end which can be swung upwardly from a first retracted position to a second upstanding cargo engaging position; a pair of second linkage members having a root end by which said second members are pivotally secured to said base member, and having a swing end which can be swung upwardly from a first retracted position to a second upstanding cargo-engaging position; a cargo securing lug member which is rotationally secured by one end to said swing end of said first pair of linkage members and by its other end to said swing end of said second pair of linkage members, whereby, with said first and second pair of linkage members in their upstanding cargo-engaging position, said lug member extends parallel to and raised above and base member in a cargo-engaging position, and whereby, with said first and second pair of linkage members in their retracted position, said lug member is substantially coincidingly disposed in a retracted position with said base member; said pair of first and second linkage members being identically and symmetrically mounted between said base and said cargo-engaging lug so that an evenly distributed holding strength is maintained to said cargo-engaging lug when said lug is in said upstanding engaging position pivotally mounted between said swing ends of said first and said second linkage members while holding an associated cargo container bottom edge; a locking member pawl pivotally connected to said lug member; cam means disposed on first pair of linkage members swing end for complementing engagement with said locking member pawl when said first and second pair of linkage members are in said second upstanding cargo-engaging position for preventing retraction of said securing device; a first spring means mounted between said base member and said first pair of linkage members for applying a force which biases said first pair of linkage members in said retracted position with said base member; a second spring means mounted between said locking member and said cargo securing lug member for applying a force which biases said locking member pawl about its pivoting connection against said second pair of linkage members swing end portion for complementing engagement of said locking member pawl with said cam in said upstanding cargo-engaging position of said first and second pair of linkage members; and said second pair of linkage members being provided with a short extended handle portion and wherein said locking pawl member is provided with a lip portion for respectively manually lifting said linkage members and lug into said cargo-engaging position by said extending handle portion and fur unlocking said locking pawl from said cam by manually pressing said lip portion for disengagement of said pawl from said cam for collapsing said locked lug member into said retracted position.

* * * * *